United States Patent [19]
Reibling

[11] Patent Number: 5,172,513
[45] Date of Patent: Dec. 22, 1992

[54] INSECT TRAP

[76] Inventor: Douglas J. Reibling, 92 Blake Street, Stratford, Ontario, Canada, N5A 2C6

[21] Appl. No.: 848,142

[22] Filed: Mar. 9, 1992

[51] Int. Cl.$^5$ .............................................. A01M 1/10
[52] U.S. Cl. ..................................... 43/121; 43/107
[58] Field of Search ................ 43/107, 121, 120, 122, 43/123, 116, 117, 118

[56] References Cited

U.S. PATENT DOCUMENTS

| | | | |
|---|---|---|---|
| 1,047,282 | 12/1912 | Penn et al. | 43/107 |
| 2,162,502 | 6/1939 | Goulard | 43/107 |
| 4,557,069 | 12/1985 | Caldwell | 43/107 |
| 4,694,604 | 9/1987 | Mitchell | 43/107 |
| 4,706,410 | 11/1987 | Briese | 43/107 |
| 4,858,374 | 8/1989 | Clemons | 43/122 |

Primary Examiner—Richard K. Seidel
Assistant Examiner—Chuck Y. Mah
Attorney, Agent, or Firm—Daryl W. Schnurr

[57] ABSTRACT

A trap for sap beetles and the like has a container with side walls that diverge from a base thereof. The container has an elongated bag made of flexible plastic inserted therein. The support has a mouth with a lip surrounding said mouth and the bag has a closed end and an open end. The bag is mounted within the support so that a closed end of the bag extends downward beneath said lip in a generally U-shaped configuration. The bag is formed around the ring into the shape of a truncated cone that extends downward from the lip above the closed end. There is an opening in the bag through a center of the ring and the bag is sealed around the lip with a removable cover resting on the lip. The cover contains perforations that are large enough to permit sap beetles to pass therethrough. The closed end of the bag contains a liquid bait to attract the sap beetles. When the sap beetles enter the trap through the perforations in the cover and move past the truncated cone into the liquid bait, it is extremely unlikely that they will subsequently be able to escape from the trap. The cover can be removed and the bag containing the bait and the trapped sap beetles can be removed from the container and discarded. A new bag can then be inserted into the container and formed into the shape of a truncated cone around the ring.

8 Claims, 1 Drawing Sheet

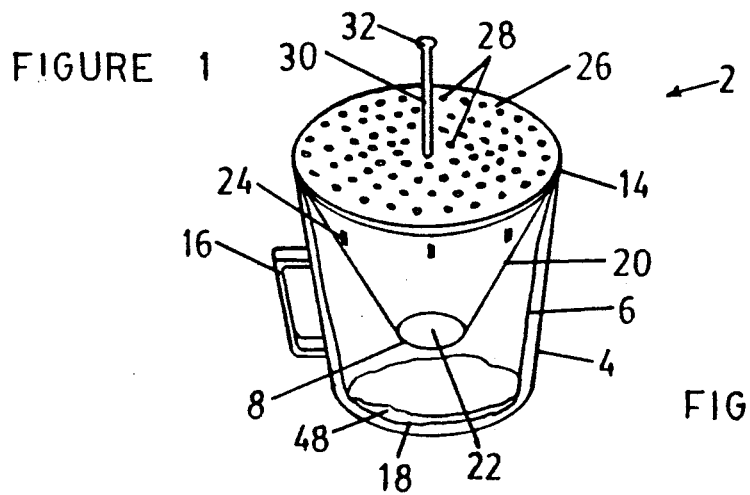
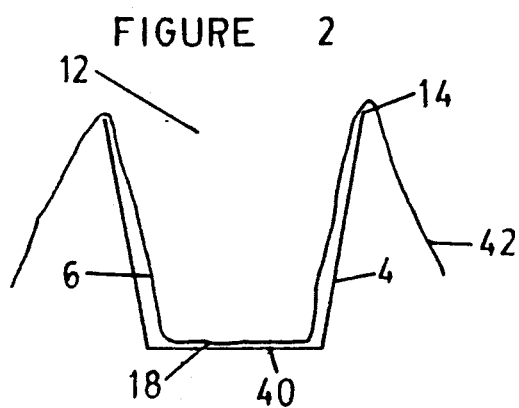
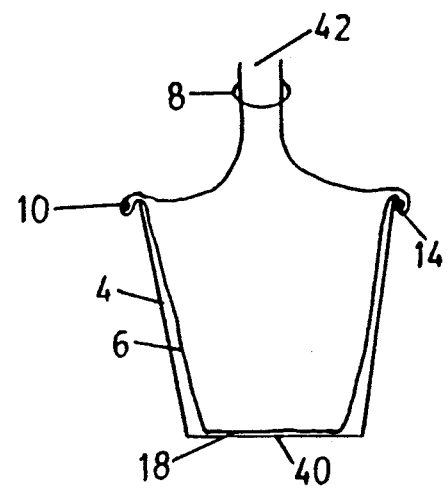
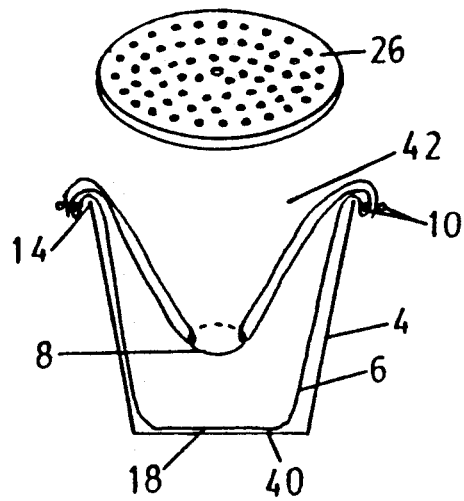
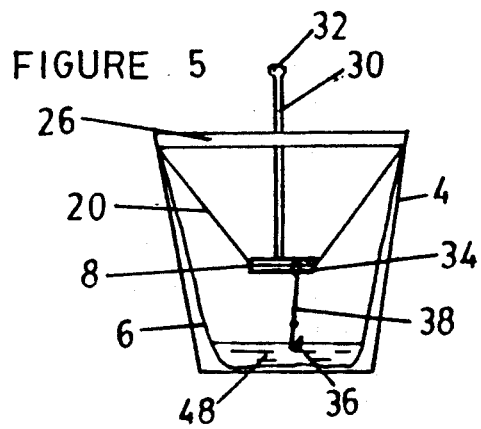
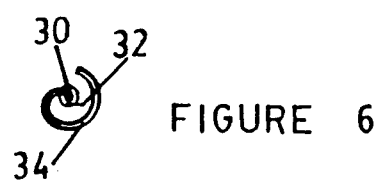

INSECT TRAP

BACKGROUND OF THE INVENTION

1. Field of the Invention

This invention relates to a trap for insects such as sap beetles and the like and, in particular, to a trap having a container with a disposable liner that is formed into a truncated cone, so that when insects move past the cone into a base of the trap, they are unlikely to be able to move out of the trap.

2. Description of the Prior Art

Previous insect traps do not work efficiently enough; or, they are too expensive to manufacture; or, they are difficult or impossible to clean; or, they are too complex; or, insects can escape from the trap.

SUMMARY OF THE INVENTION

It is an object of the present invention to provide a trap for insects, such as sap beetles and the like, where the trap is of simple construction and contains a disposable liner so that the trap can be easily cleaned.

A trap for insects such as sap beetles and the like has an elongated bag made of flexible and impermeable material, a support, a ring and sealing means. The support has a mouth with a lip surrounding said mouth. The bag has a closed end and an open end, said bag being mounted within said support so that a closed end of said bag extends downward beneath said lip in a generally U-shaped configuration. The bag is formed around said ring into the shape of a truncated cone that extends downward from said lip above said closed end, there being an opening in said bag through a centre of said ring. The bag is sealed around said lip with a removable cover resting on said lip. The cover contains perforations large enough to permit said insects to pass therethrough.

BRIEF DESCRIPTION OF THE DRAWINGS

In the drawings:

FIG. 1 is a perspective view of an assembled insect trap;

FIG. 2 is a schematic side view showing a first step in the assembly of the trap;

FIG. 3 is a schematic side view of a second step in the assembly of the trap;

FIG. 4 is a schematic side view of a third assembly of the trap;

FIG. 5 is a schematic side view of a fourth step in the assembly of the trap; and FIG. 6 is a bottom view of an elongated member.

DESCRIPTION OF A PREFERRED EMBODIMENT

In FIGS. 1, 2 and 3, a trap 2 has a support or container 4 for an elongated bag 6, the bag 6 preferably being made of flexible plastic. The trap 2 has a ring 8 and sealing means 10 (not shown in FIG. 1). The container 4 has a mouth 12 with a lip 14 surrounding said mouth. The container 4 also has grasping means 16. The bag 6 has a closed end 18 and an open end (not shown in FIG. 1). The closed end 18 extends downward beneath said lip 14 in a generally U-shaped configuration. Part of the bag 6 is formed into the shape of a truncated cone 20 around said ring 8. The truncated cone extends downward from said lip 14 above said closed end 18. There is an opening 22 through said ring. The container 4 has vents 24 around the upper side wall so that air can escape from the container through the vents as the bag is inserted. A removable cover 26 rests on said lip 14. The cover contains perforations 28 which are large enough to permit insects (not shown) to pass therethrough. The container in FIG. 1 is shown with transparent side walls for ease of illustration to expose the interior.

An elongated member 30 has a handle 32 at an upper end and a ring-shaped spring 34 at a lower end. The spring 34 and the lower portion of the member 30 are omitted from FIG. 1 to avoid confusion. As shown in FIGS. 5 and 6, the spring is sized so that it can be made to rest within said ring and is held in place by its own force. The spring 34 has a hook 36 extending downward therefrom on a line 38. When it is desired to remove the bag 6 from the container, the handle 32 can be moved upward so that the hook 36 contacts the ring 8 and pulls it upward along with that part of the bag 6 that forms the truncated cone.

The assembly of the trap is shown in FIGS. 2, 3 and 4. In FIG. 2, the first step of assembling the trap is shown. The bag 6 is inserted into the container 4 with a closed end 18 of the bag formed in a U-shape along a base 40 of the container. The container preferably has sloped side walls. The bag extends over the lip 14 of the mouth 12 so that an open end 42 of the bag rests outside of the container.

In FIG. 3, it can be seen that sealing means, preferably being an elastic band, is placed around said lip to hold one layer of a side of said bag against said lip and to hold the U-shaped closed end 18 in position within said container 4. The open end 42 is then pulled together so that the ring 8 can be inserted over said open end and partially down the sides of said bag to a point that is approximately the mid-point between said open end 42 and the lip 14.

As shown in FIG. 4, the ring is placed so that it extends downward beneath said lip but above said closed end. The open end 42 is placed over said lip and held in position by a second elastic band or sealing means 10 to hold said open end against said lip. The cap 26 is then placed on top of said container to rest on said lip. The cap is preferably sized to properly fit in a top of said container so that it is surrounded by said lip. Preferably, the cap will contain the elongated member 30. Prior to inserting the cap into the container, the liquid bait 48 is placed in a closed end of said bag 6.

The trap, when assembled, can then be placed in a location where it will attract insects of the type desired to be trapped. When the trap is used to trap sap beetles (sometimes referred to as beer bugs), the beetles will enter through the perforations 28 in the cap 26 and will pass through the ring 8 into the bait 48. When wet, the beetles can no longer fly and they are unable to walk upside down along the interior slope of the truncated cone 20. Even if the beetles could fly, it would be extremely difficult that they could escape the trap as they would be unable to fly directly through a perforation 28. When the beetles strike the cap 26, they will fall back into the bait.

When it is desired to disassemble the trap, the cap can be removed and the hook can pull up the ring. The second elastic band can then be removed and the ring can be removed. The ring will not be messy as it is located on the outer surface of the bag. The first elastic band can then be removed while the open end 42 is held in a closed position with one hand. The entire bag, including the bait and the beetles can then be disposed of.

A new bag can then be placed in the container 4 to reset the trap. Preferably, the container will be sized so that the elongated bag can be a conventional plastic bread bag. The container could be designed without solid side walls and without a solid base so long as the bag was supported in the general shape shown in the drawings.

What I claim as my invention is:

1. A trap for insects, said trap comprising an elongated bag made of flexible and impermeable material, a support, a ring and sealing means, said support having a mouth with a lip surrounding said mouth, said bag having a closed end and an open end, said bag being mounted within said support so that a closed end of said bag extends downward beneath said lip in a generally U-shaped configuration, said bag being formed around said ring into a shape of a truncated cone that extends downward from said lip above said closed end, thereby forming an opening in said bag through a centre of said ring, the bag being sealed around said lip with a removable cover resting on said lip, said cover containing perforations to permit said insects to pass therethrough.

2. A trap as claimed in claim 1 wherein the bag is made of plastic and the support is a container having a base with sloped sides that diverge between said base and said lip.

3. A trap as claimed in claim 2 wherein the sealing means is at least one elastic band that extends around said lip to hold said bag against said lip.

4. A trap as claimed in claim 3 wherein there are two elastic bands and two layers of said plastic bag around said lip, one elastic band located to the outside of each layer to hold each layer against said lip.

5. A trap as claimed in claim 4 wherein there is a liquid bait located in a closed end of said bag.

6. A trap as claimed in claim 5 wherein the bag is formed around said ring by inserting that part of the sides of said bag between said closed end and said open end through said ring and suspending said ring above said closed end from said lip.

7. A trap as claimed in claim 6 wherein the cover has a central opening for receiving an elongated member having a handle at an upper end and a ring-shaped spring at a lower end, said ring-shaped spring being sized so that said spring can be made to rest within said ring and is held in place by the force of said spring, said spring having a hook extending downward therefrom, said handle extending outside of said cover.

8. A method of setting a trap for insects, said trap having an elongated bag made of flexible and permeable material, a support, a ring and two elastic bands, said support having a mouth with a lip surrounding said mouth, said bag having a closed end and an open end, said method comprising inserting a closed end of said bag within said support beneath said lip, folding the sides of said bag over said lip and installing one elastic band around said lip outside of said plastic bag to seal said bag against said lip, installing said ring over an open end of said plastic bag and allowing said ring to slide down the sides of said bag so that it rests in said support above said closed end, folding the open end of said bag over said lip and installing the second elastic band to seal said open end against said lip and installing a perforated cover.

* * * * *